United States Patent
Motoi et al.

(10) Patent No.: US 11,504,993 B2
(45) Date of Patent: Nov. 22, 2022

(54) HINGED LAMINATE BODY, BOOKLET, AND LAMINATE BODY

(71) Applicant: Dai Nippon Printing Co., Ltd., Tokyo (JP)

(72) Inventors: Takumi Motoi, Tokyo (JP); Toru Nishioka, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 243 days.

(21) Appl. No.: 16/466,412

(22) PCT Filed: Nov. 30, 2017

(86) PCT No.: PCT/JP2017/043126
§ 371 (c)(1),
(2) Date: Jun. 4, 2019

(87) PCT Pub. No.: WO2018/105495
PCT Pub. Date: Jun. 14, 2018

(65) Prior Publication Data
US 2020/0070565 A1    Mar. 5, 2020

(30) Foreign Application Priority Data

Dec. 5, 2016 (JP) .............................. JP2016-235894

(51) Int. Cl.
*B32B 3/02* (2006.01)
*B32B 27/08* (2006.01)
(Continued)

(52) U.S. Cl.
CPC .............. *B42D 25/333* (2014.10); *B32B 3/02* (2013.01); *B32B 27/08* (2013.01); *B32B 27/16* (2013.01);
(Continued)

(58) Field of Classification Search
None
See application file for complete search history.

(56) References Cited

U.S. PATENT DOCUMENTS

| 4,544,181 A | 10/1985 | Maurer et al. |
| 6,135,503 A | 10/2000 | Lob et al. |

(Continued)

FOREIGN PATENT DOCUMENTS

| EP | 0917966 A1 | 5/1999 |
| JP | 55-146795 A | 11/1980 |

(Continued)

OTHER PUBLICATIONS

International Search Report dated Jan. 30, 2018, issued for PCT/JP2017/043126.
(Continued)

*Primary Examiner* — Laura C Powers
(74) *Attorney, Agent, or Firm* — Locke Lord LLP; James E. Armstrong, IV; Nicholas J. DiCeglie, Jr.

(57) ABSTRACT

Provided are a hinged laminate body, a booklet, and a laminate body that are able to increase the installation area of a member for authenticity determination. A hinged laminate body is configured so as to be able to increase the installation area of a member for authenticity determination by being provided with: an upper transparent layer; watermarked paper that is arranged below the upper transparent layer; and a hinge layer that has a hinge portion protruding from the upper transparent layer in a plan view and that is arranged below the watermarked paper. The watermarked paper of the hinged laminate body is provided with: an inner watermarked paper section that is arranged between the upper transparent layer and the hinge layer; and an outer
(Continued)

watermarked paper section that is provided to the hinge portion so as to be arranged contiguously with the inner watermarked paper section.

5 Claims, 8 Drawing Sheets

(51) Int. Cl.
    *B32B 27/16*     (2006.01)
    *B32B 27/36*     (2006.01)
    *G06K 19/077*     (2006.01)
    *B42D 25/333*     (2014.01)
    *B42D 25/41*     (2014.01)
    *B42D 25/24*     (2014.01)

(52) U.S. Cl.
    CPC .............. *B32B 27/36* (2013.01); *B42D 25/41* (2014.10); *G06K 19/07722* (2013.01); *B32B 2262/0261* (2013.01); *B32B 2262/0284* (2013.01); *B32B 2307/412* (2013.01); *B32B 2425/00* (2013.01); *B42D 25/24* (2014.10)

(56) References Cited

U.S. PATENT DOCUMENTS

| | | | |
|---|---|---|---|
| 2011/0215563 A1 | 9/2011 | Rancien et al. | |
| 2014/0326789 A1* | 11/2014 | Lim | G06K 19/077 235/488 |
| 2015/0352880 A1* | 12/2015 | Pudleiner | C09D 5/22 235/488 |
| 2016/0207343 A1 | 7/2016 | Springmann et al. | |
| 2016/0355045 A1* | 12/2016 | Ivester | B42D 13/00 |
| 2018/0037046 A1* | 2/2018 | Sugdon | B42D 25/373 |
| 2018/0304666 A1* | 10/2018 | Brunet | G06K 19/07749 |

FOREIGN PATENT DOCUMENTS

| | | |
|---|---|---|
| JP | 03-067878 B2 | 10/1991 |
| JP | 2010-089374 A | 4/2010 |
| JP | 2011-525672 A | 9/2011 |
| JP | 2011-246832 A | 12/2011 |
| WO | 2013/128961 A1 | 9/2013 |

OTHER PUBLICATIONS

Extended European Search Report issued in the EP Patent Application No. EP17879530.8, dated Jul. 14, 2020.

* cited by examiner

FIG. 3A  NORMAL OBSERVATION STATE FROM UPPER SIDE
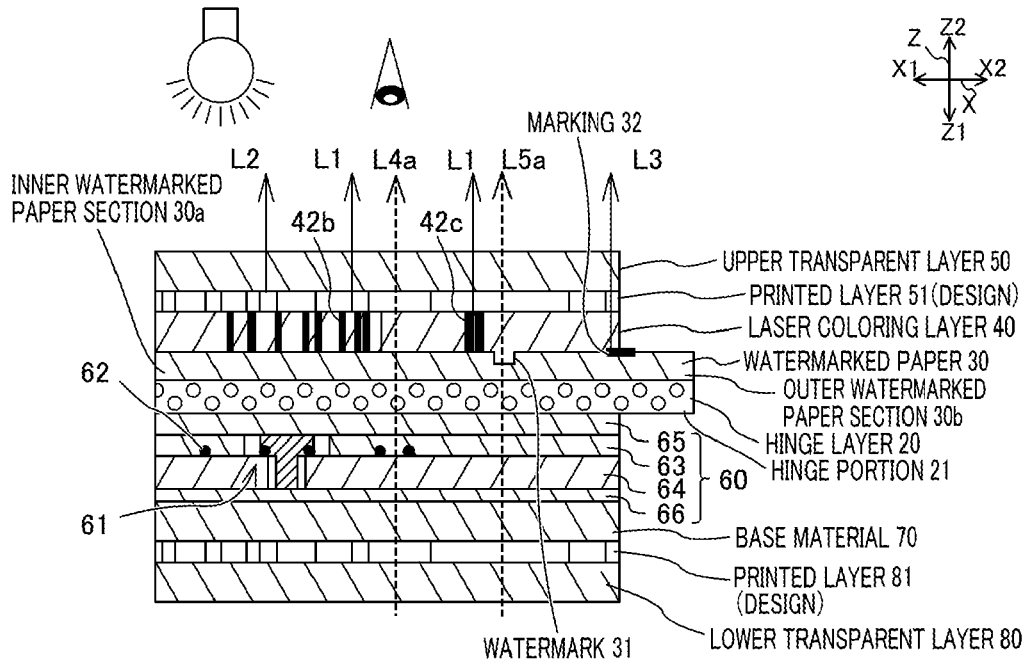
FIG. 3B  WATERMARK OBSERVATION STATE FROM UPPER SIDE
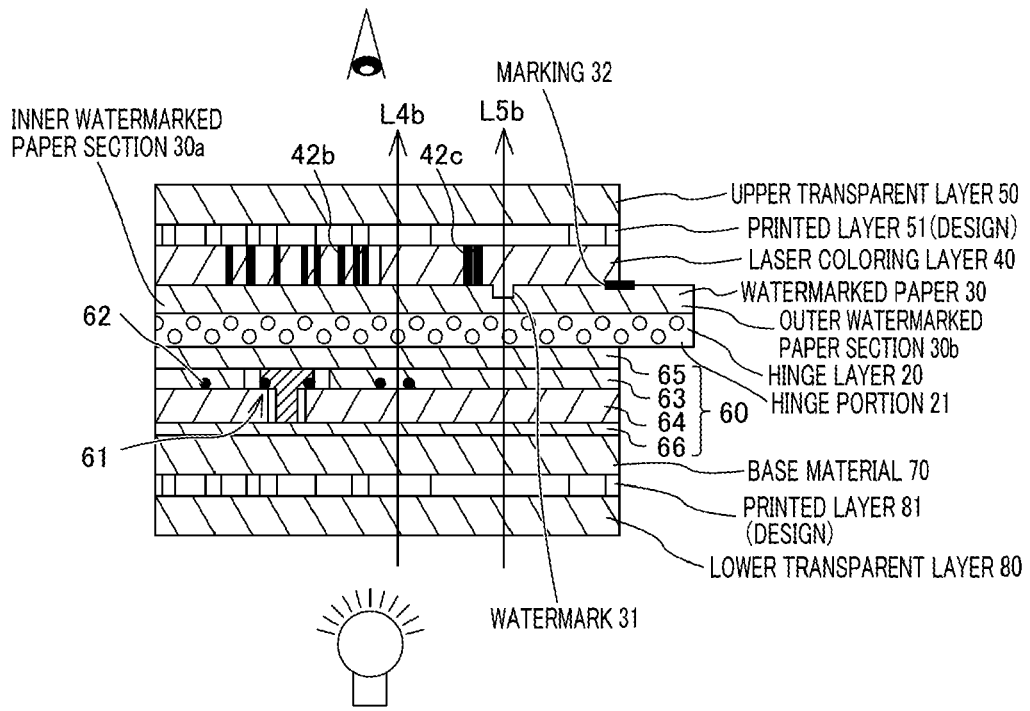

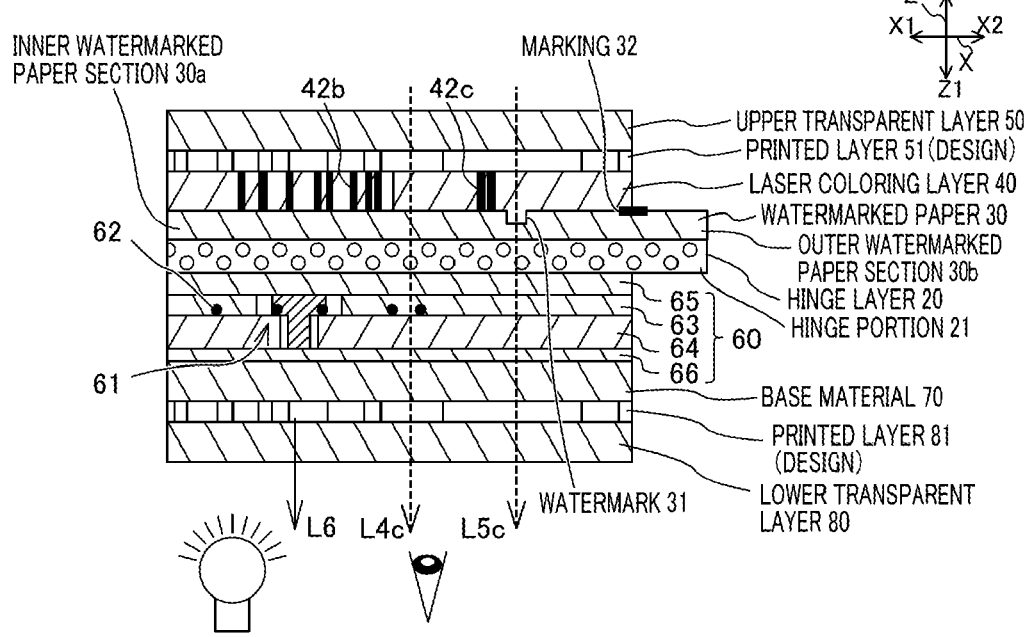
FIG. 4A  NORMAL OBSERVATION STATE FROM LOWER SIDE
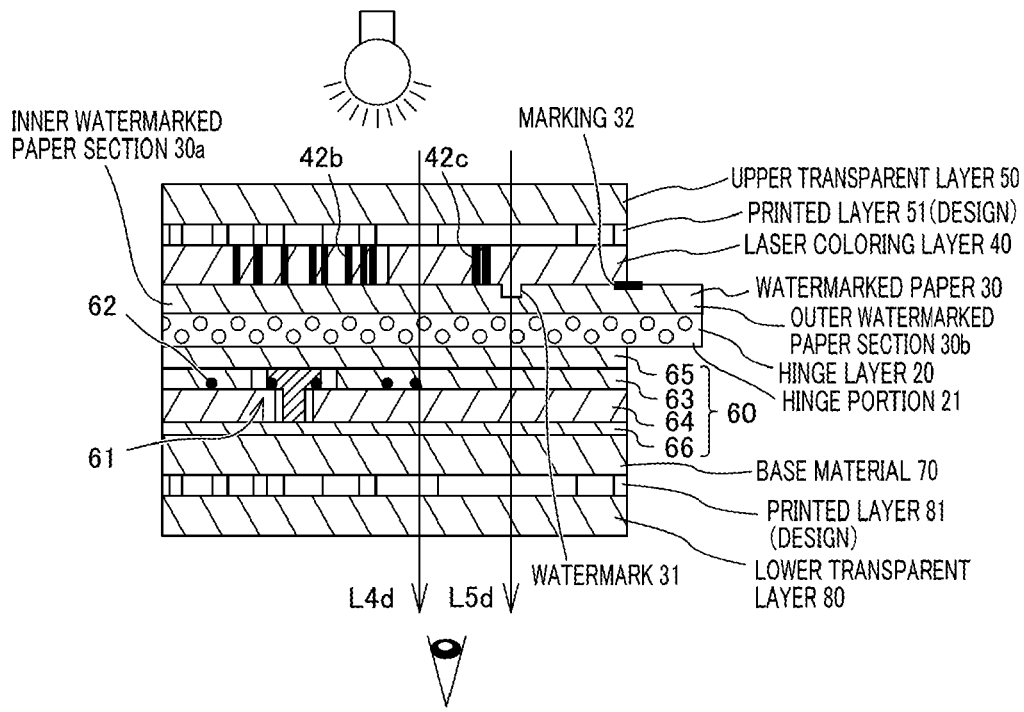
FIG. 4B  WATERMARK OBSERVATION STATE FROM LOWER SIDE

HINGED LAMINATE BODY, BOOKLET, AND LAMINATE BODY

TECHNICAL FIELD

The present invention relates to a hinged laminate body, a booklet, and a laminate body that are able to determine authenticity.

BACKGROUND ART

In the related art, a card or the like is provided with a hologram or the like for authenticity determination (for example, Patent Document 1). However, the hologram or the like has a small installation area and can only be provided in a partial area of the card or the like.

Patent Document 1: Japanese Unexamined Patent Application, Publication No. 2010-89374

DISCLOSURE OF THE INVENTION

Problems to be Solved by the Invention

An object of the present invention is to provide a hinged laminate body, a booklet, and a laminate body that are able to increase the installation area of a member for authenticity determination.

Means for Solving the Problems

The present invention solves the problem by the following solving means. In order to facilitate understanding, reference numerals corresponding to embodiments of the present invention are given for the description, but the present invention is not limited thereto. In addition, configurations described with reference numerals may be modified as appropriate, and at least a part thereof may be replaced by another configuration.

A first invention is a hinged laminate body including: a transparent resin layer (50); a watermarked sheet material (30, 330, 430) arranged below the transparent resin layer (50); and a hinge layer (20) that is arranged below the watermarked sheet material (30, 330, 430) and has a hinge portion (21) protruding from the transparent resin layer (50) in a plan view.

A second invention is the hinged laminate body according to the first invention, in which the watermarked sheet material (30, 330, 430) includes: an interlayer arrangement portion (30a) arranged between the transparent resin layer (50) and the hinge layer (20); and a hinge arrangement portion (30b) that is provided to the hinge portion (21) so as to be arranged contiguously with the interlayer arrangement portion (30a).

A third invention is the hinged laminate body according to the second invention, in which the watermarked sheet material (30, 330, 430) has a watermark (31), and the watermark (31) is formed contiguously with the interlayer arrangement portion (30a) and the hinge arrangement portion (30b).

A fourth invention is the hinged laminate body according to the second or third invention, in which the watermarked sheet material (30, 330) includes a laser marking (32), and the laser marking (32) is contiguous with the interlayer arrangement portion (30a) and the hinge arrangement portion (30b).

A fifth invention is the hinged laminate body according to any one of the first to fourth inventions, further including: an electronic component holding layer (60) that is disposed below the watermarked sheet material (30, 330, 430) and holds an electronic component (61, 62).

A sixth invention is a hinged laminate body including: a hinge layer (20) having a hinge portion (21) that is able to be bound to a booklet (1) and protrudes outward from a transparent resin layer (50); and a watermarked sheet material (30, 290, 330, 390) arranged on at least one of an upper side and a lower side of the hinge portion (21).

A seventh invention is a booklet (1) including: the hinged laminate body according to any one of the first to fifth inventions bound at the hinge portion (21).

An eighth invention is a laminate body including: a transparent resin layer (50); and a watermarked sheet material (530) arranged below the transparent resin layer (50).

A ninth invention is the laminate body according to the eighth invention, in which the watermarked sheet material (530) includes a laser marking (32).

A tenth invention is the laminate body according to the eighth or ninth invention, further including: an electronic component holding layer (60) that is disposed below the watermarked sheet material (530) and holds an electronic component (61, 62).

Effects of the Invention

According to the present invention, it is possible to provide a hinged laminate body, a booklet, and a laminate body that are able to increase the installation area of a member for authenticity determination.

BRIEF DESCRIPTION OF THE DRAWINGS

FIGS. 3A and 3B are views illustrating observation aspects of the hinged laminate body 10 of the first embodiment.

FIGS. 4A and 4B are views illustrating observation aspects of the hinged laminate body 10 of the first embodiment.

PREFERRED MODE FOR CARRYING OUT THE INVENTION

Embodiment

Hereinafter, embodiments of the present invention will be described with reference to the drawings and the like.

First Embodiment

Figure 1A:
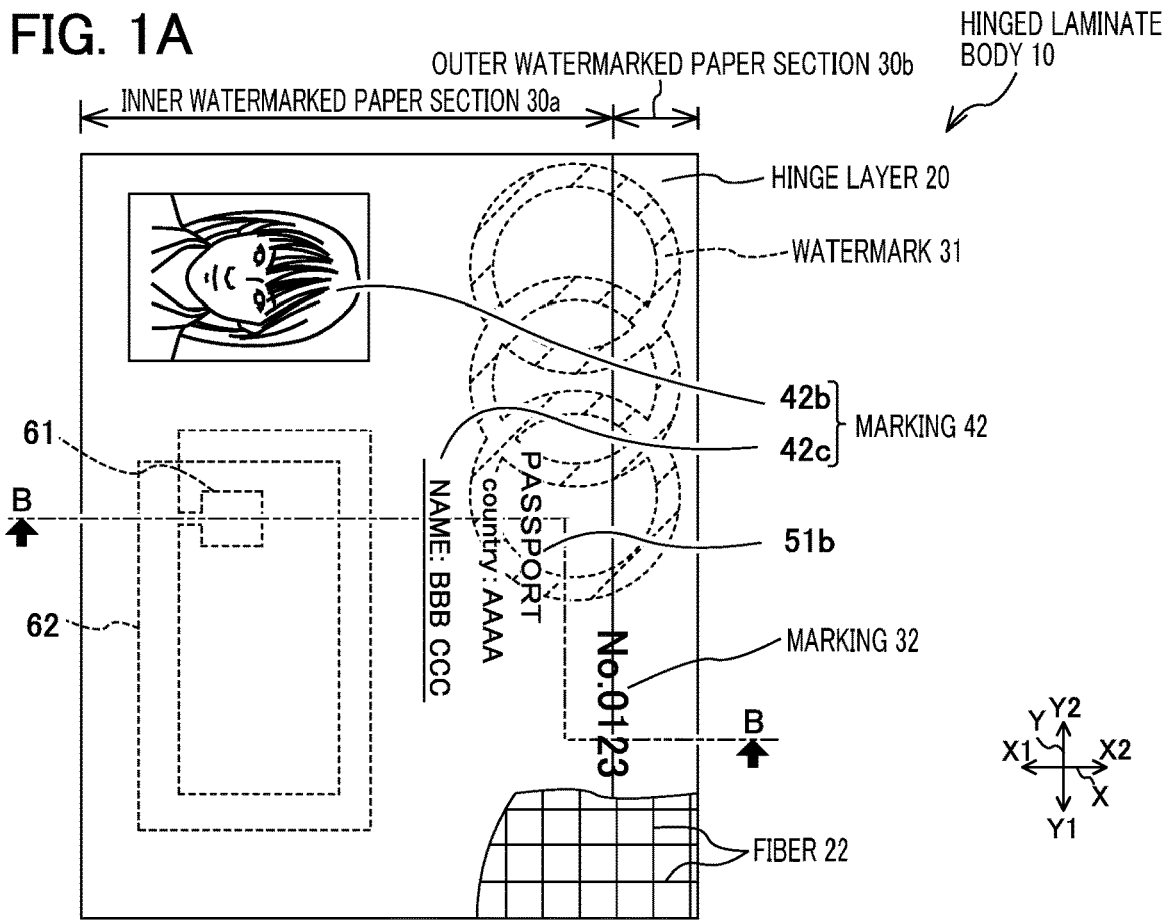
FIGS. 1A and 1B are views illustrating the configuration of a hinged laminate body 10 of a first embodiment.
Figure 1B:
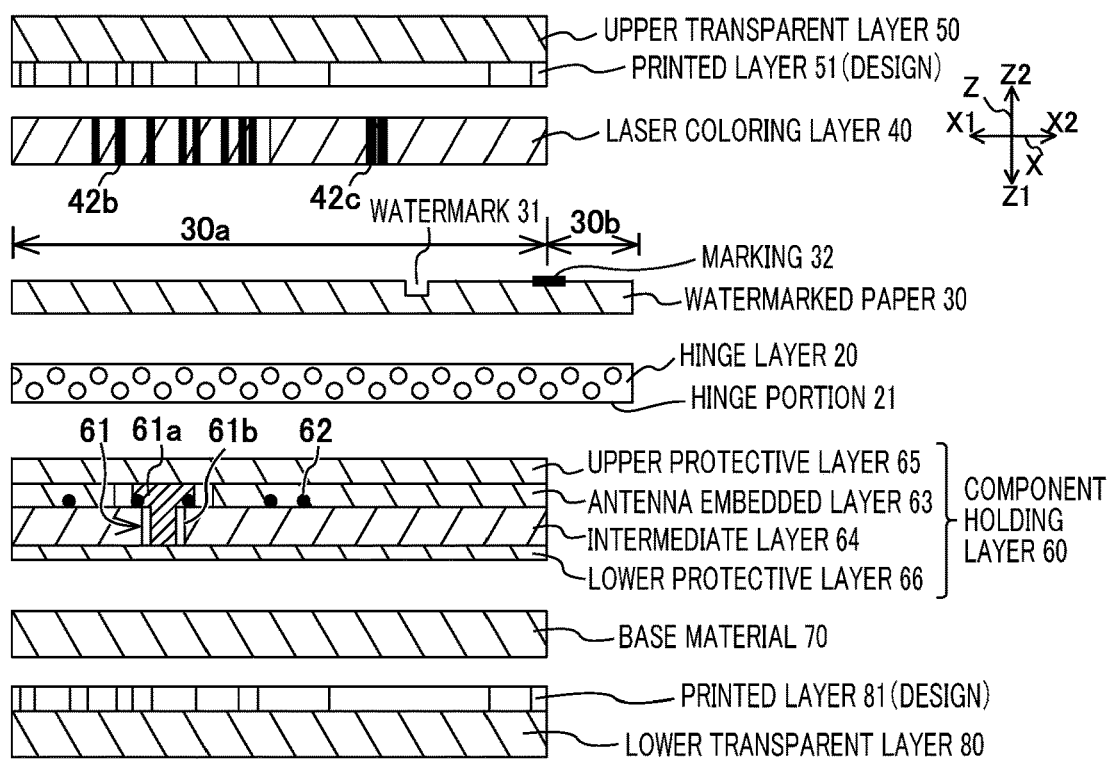
Figure 2A:
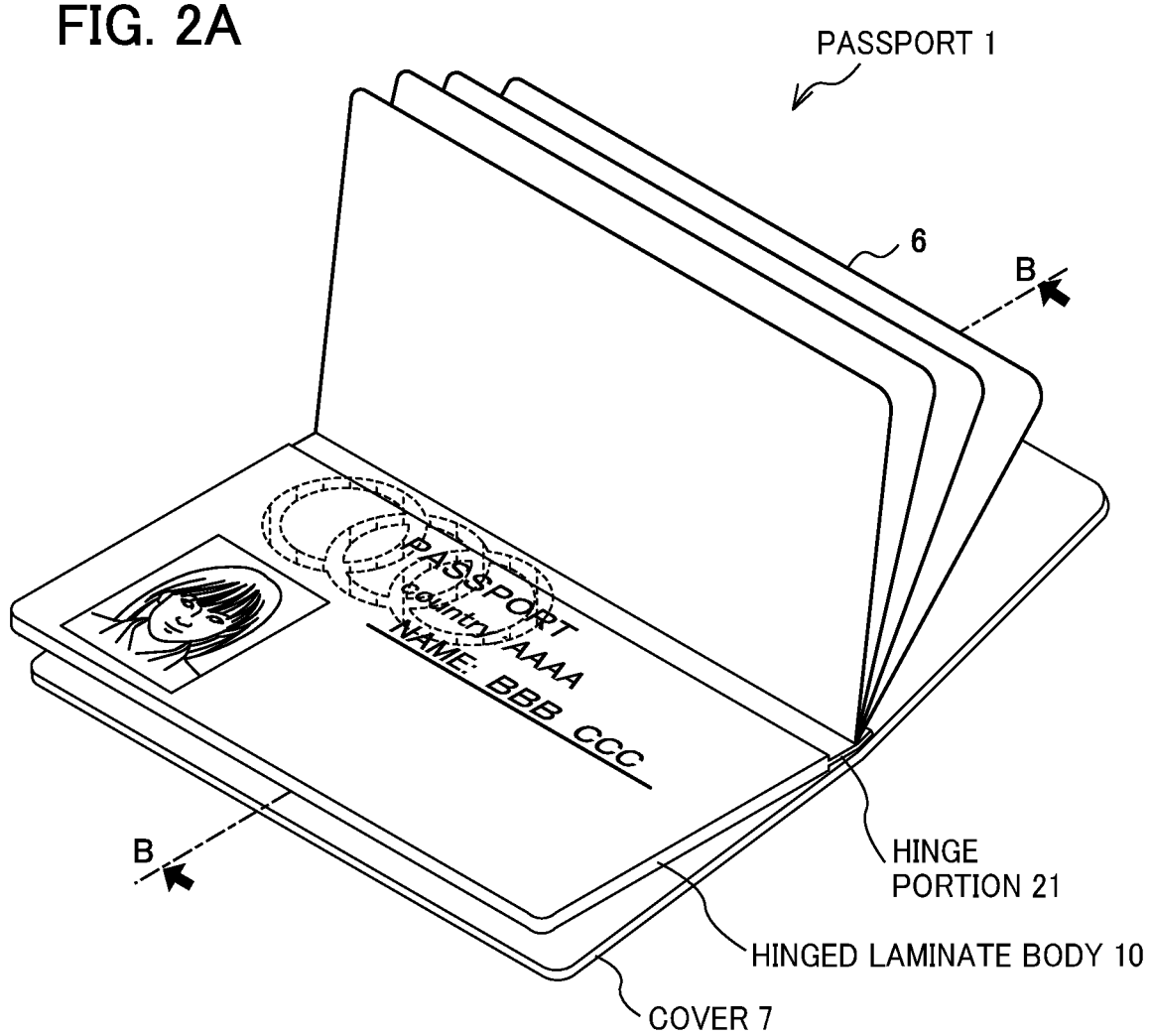
FIGS. 2A and 2B are views illustrating a passport 1 of the first embodiment.
Figure 2B:
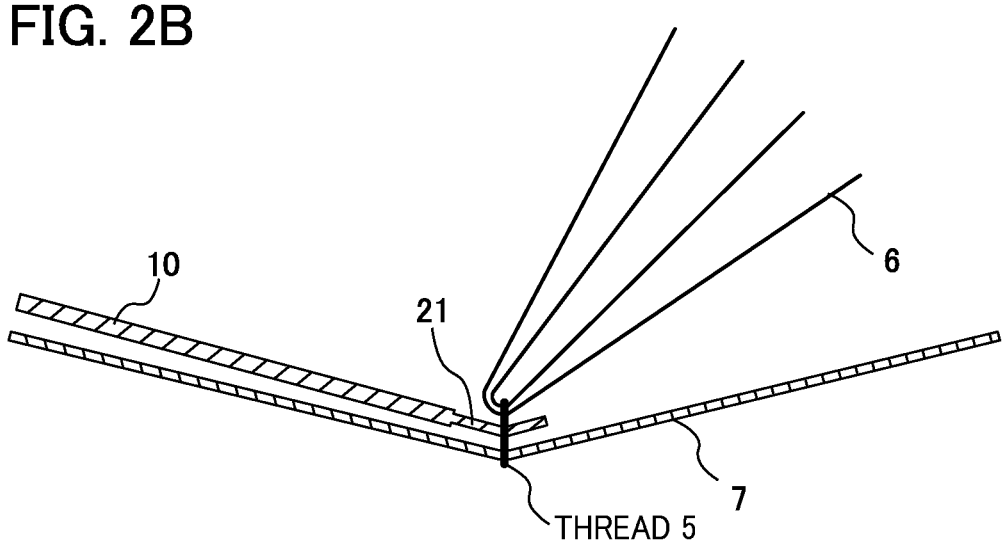

FIGS. 1A and 1B are views illustrating the configuration of a hinged laminate body 10 of a first embodiment. FIG. 1A is a view of the hinged laminate body 10 as viewed from an upper side Z2 (direction normal to the upper surface) in a thickness direction Z. FIG. 1B is a cross-sectional view of the hinged laminate body 10 (cross-sectional view taken along line B-B of FIG. 1A) and also illustrates a color formation aspect of a photographic image 42*b* of a laser coloring layer 40. The same applies to the subsequent drawings. FIGS. 2A and 2B are views illustrating a passport 1 of the first embodiment. FIG. 2A is a perspective view of a state in which a page formed by the hinged laminate body 10 is opened. FIG. 2B is a cross-sectional view of a state where the page formed by the hinged laminate body 10 is opened (cross-sectional view taken along line B-B of FIG. 2A). In the embodiments and drawings, an XYZ orthogonal coordinate system is provided. This coordinate system represents a left-right direction X (left side X1 and right side X2), a longitudinal direction Y, and a thickness direction Z with reference to the state of FIG. 1A. Here, in particular, the direction of the thickness direction Z (lower side Z1 and upper side Z2) is common to the present specification and the claims, and will be described using the terms such as the upper side and the lower side as appropriate. However, the upper and lower directions are for describing directions in a layer configuration in the present invention, and do not always represent the upper side and the lower side in the direction of gravity in a state of use. Therefore, for example, the side described as the lower side in the present specification is not limited to the lower side in the direction of gravity. Therefore, the side described as the lower side may be used so as to be the upper side in the direction of gravity, or may be used so as to be directed in a horizontal direction.

As illustrated in FIGS. 2A and 2B, the hinged laminate body 10 according to the present embodiment is bound together with the other pages 6 and a cover 7 by passing a thread 5 or the like through a hinge portion 21. Accordingly, the hinged laminate body 10 is bound to the passport 1 (booklet). The hinged laminate body 10 is used for a status information page of the passport 1 (also referred to as an IC passport or the like) having an IC chip 61*b* embedded therein. The use of the hinged laminate body 10 is not limited to the passport 1, and may be used for book management, for example, by being bound to a book.

[Configuration of Hinged Laminate Body 10]

As illustrated in FIGS. 1A and 1B, the hinged laminate body 10 is a laminate of a hinge layer 20, watermarked paper 30 (watermarked sheet material), the laser coloring layer 40, an upper transparent layer 50, a component holding layer 60 (electronic component holding layer), a base material 70, and a lower transparent layer 80. On the upper side Z2 of the hinge layer 20, the watermarked paper 30, the laser coloring layer 40, and the upper transparent layer 50 are arranged from the lower side Z1 toward the upper side Z2. On the lower side Z1 of the hinge layer 20, the component holding layer 60, the base material 70, and the lower transparent layer 80 are arranged from the upper side Z2 toward the lower side Z1. The respective layers are bonded by thermal welding or the like (see FIG. 3A and the like). Therefore, the layers other than the watermarked paper 30 may be formed using a sheet material of resin (for example, PET-G, PVC, or PC) having good thermal weldability. The same applies to each layer of the component holding layer 60.

The color and outer shape of the hinged laminate body 10 are as follows. The color of the watermarked paper 30 and the base material 70 is white. The base material 70 may be formed of, for example, a white material, or may be formed by applying white printing on a transparent resin sheet material. The hinge layer 20, the laser coloring layer 40, the upper transparent layer 50, the component holding layer 60, and the lower transparent layer 80 are transparent and have a light-transmitting property.

The shape of the hinged laminate body 10 viewed from the surface (upper surface or lower surface) is quadrangular (rectangular). The outer shapes of the laser coloring layer 40, the upper transparent layer 50, the component holding layer 60, the base material 70, and the lower transparent layer 80 are the same. In addition, the outer shapes of the hinge layer 20 and the watermarked paper 30 are the same. The lengths of the hinge layer 20 and the watermarked paper 30 in the left-right direction X are larger than the lengths of the other layers including the laser coloring layer 40, the upper transparent layer 50, the component holding layer 60, the base material 70, and the lower transparent layer 80 in the left-right direction X. This portion with a larger length protrudes toward the right side X2 (outside) on the right side surface (side surface of the side to be bound to the passport 1) of the hinged laminate body 10. The protruding portion constitutes the hinge portion 21 and an outer watermarked paper section 30*b* (described later). That is, in a plan view, the hinge layer 20 and the watermarked paper 30 respectively have the hinge portion 21 and the outer watermarked paper section 30*b* protruding beyond the other layers including the laser coloring layer 40, the upper transparent layer 50, the component holding layer 60, the base material 70, and the lower transparent layer 80. As described above, the upper transparent layer 50 and the hinge layer 20 are both formed in a rectangular shape. Minor changes such as rounding the corners of the rectangle are included in the rectangular shape. Furthermore, the hinge portion 21 is configured to protrude only from one side surface of the hinge layer 20. Therefore, by binding the hinge portion 21 (using as a binding margin), it is possible to align the shape of the upper transparent layer 50 with the other pages 6 and the cover 7 in a plan view and bind them together. In order to thermally weld the layers of the protruding portion in this manner, a heat press plate may be used which is not flat and has stages corresponding to the shapes of the hinge portion 21 and the outer watermarked paper section 30*b*.

Hereinafter, each layer will be described in detail. The hinge layer 20 includes the hinge portion 21. As described above, the hinge portion 21 is a portion of the hinge layer 20 that is larger than the other layers including the laser coloring layer 40, the upper transparent layer 50, the component holding layer 60, the base material 70, and the lower transparent layer 80. As in the above-described layer configuration, the hinge layer 20 is arranged on the lower side Z1 under the watermarked paper 30. The hinge layer 20 has sufficient flexibility to function as a hinge, sufficient tensile strength not to break, sufficient durability not to break even when repeatedly bent, and the like. As the hinge layer 20, for example, one having fibers 22 such as PET and polyamide arranged in a lattice pattern between layers of a plurality of PET-G resin sheets may be used. The fiber 22 also has a light-transmitting property.

As in the above-described layer configuration, the watermarked paper 30 is arranged immediately above the hinge layer 20. In addition, the watermarked paper 30 is arranged on the lower side Z1 under the laser coloring layer 40 and the upper transparent layer 50. The watermarked paper 30 is a general watermarked paper. That is, the watermarked paper 30 has partially thin (or thick) thicknesses in the paper and reveals a pattern such as a design, figure, or text as a watermark 31 when viewed by transmitted light. The watermark 31 in FIG. 1A has a design of three overlapping circles. The watermarked paper 30 is arranged immediately above the hinge layer 20.

The watermarked paper 30 is a sheet of paper material, and the outer shapes of the hinge layer 20 and the watermarked paper 30 are the same as described above. Therefore, the watermarked paper 30 includes an inner watermarked paper section 30a (interlayer arrangement portion) arranged between the laser coloring layer 40 and the upper transparent layer 50, and the hinge layer 20, and the outer watermarked paper section 30b (hinge arrangement portion) arranged on the hinge portion 21. These sections 30a and 30b are contiguous. The outer watermarked paper section 30b is exposed to the outside of the hinged laminate body 10.

The watermarked paper 30 includes the watermark 31 described above and a marking 32. In the example of FIGS. 1A and 1B, the watermark 31 is contiguous across the boundary between the inner watermarked paper section 30a and the outer watermarked paper section 30b. Therefore, a portion of the watermark 31 arranged in the inner watermarked paper section 30a is arranged between the layers, while a portion arranged in the outer watermarked paper section 30b is exposed to the outside.

Here, a hologram or the like hitherto used for authenticity determination cannot be arranged on the entire surface of a laminate body in a plan view, and even if the hologram can be arranged on the entire surface, a high cost is incurred. Contrary to this, even when the watermarked paper 30 is arranged on the entire surface of the hinged laminate body 10 when observed from the upper side Z2, the cost is low compared to a hologram or the like.

The marking 32 is a laser marking. That is, the marking 32 is formed by causing the watermarked paper 30 to generate heat and be colored black by laser irradiation. In the embodiment, such color formation is also called printing. The marking 32 may be formed, for example, when the passport 1 is issued. In the example of FIGS. 1A and 1B, the marking 32 relates to the passport number "NO. 0123" which is information unique to the owner of the passport 1.

Similarly to the watermark 31, the marking 32 is contiguous across the boundary between the inner watermarked paper section 30a and the outer watermarked paper section 30b. Therefore, a portion arranged in the inner watermarked paper section 30a is arranged between the layers, while a portion arranged in the outer watermarked paper section 30b is exposed. However, the arrangement of the markings 32 is not limited thereto, and may be arranged on only one of the inner watermarked paper section 30a and the outer watermarked paper section 30b.

The laser coloring layer 40 is arranged between the upper transparent layer 50 and the watermarked paper 30 as in the above layer configuration. The laser coloring layer 40 contains a color former. The area in the laser coloring layer 40 irradiated with the laser light is colored black by being subjected to laser marking as in the watermarked paper 30. The marking 42 of the laser coloring layer 40 is user's individual information. In the example of FIGS. 1A and 1B, although only information of the photographic image 42b and a name 42c of the user "NAME: BBB CCC" is illustrated, in practice, information such as a birth date is printed. The marking 42 may be formed, for example, when the passport 1 is issued. The material of the laser coloring layer 40 may not contain the color former as long as the color is formed by laser light irradiation. Moreover, the formed color may be a color other than black.

The upper transparent layer 50 is a transparent resin layer forming the uppermost layer of the hinged laminate body 10. A printed layer 51 is provided at the lower surface of the upper transparent layer 50. On the printed layer 51, common information, that is, information common to the owners of the passport 1 is printed. Examples of the common information include character information 51b "PASSPORT" and "country: AAAA", and a ground pattern (not illustrated). The printed layer 51 can be formed by, for example, offset printing. The printed layer 51 may be arranged so as to avoid the area where the information (such as the photographic image 42b) of the laser coloring layer 40 is arranged.

The component holding layer 60 is a layer that holds electronic components (an IC module 61, an antenna 62, and the like). As in the above layer configuration, the component holding layer 60 is arranged on the lower side Z1 under the watermarked paper 30 and is arranged on the upper side Z2 on the base material 70. That is, the component holding layer 60 is arranged between the watermarked paper 30 and the base material 70. The component holding layer 60 includes the IC module 61, the antenna 62, an antenna embedded layer 63, an intermediate layer 64, an upper protective layer 65, and a lower protective layer 66. The upper protective layer 65, the antenna embedded layer 63, the intermediate layer 64, and the lower protective layer 66 are arranged in this order from the upper side Z2 toward the lower side Z1.

The IC module 61 is accommodated in a hole passing through the antenna embedded layer 63 and the intermediate layer 64. The IC module 61 includes a mounting substrate 61a and the IC chip 61b. The mounting substrate 61a is a substrate for mounting the IC chip 61b. The IC chip 61b is a semiconductor integrated circuit element, and includes a CPU (central processing unit) as a control unit and a storage device (for example, an EEPROM). The storage device stores identification information and the like. The IC chip 61b is a type that communicates with an external device such as a reader-writer in a non-contact manner. The IC chip 61b is mounted on the lower surface of the mounting substrate 61a and sealed (packaged) by a resin or the like.

The antenna 62 is a loop antenna in which a coated conducting wire is wound in a coil shape (spiral shape). The coated conducting wire is formed by covering the periphery of the conducting wire with an insulating coating. The antenna 62 and the IC chip 61b are electrically connected to each other. A non-contact communication method between the IC module 61 and the antenna 62, and an external device is near field communication by electromagnetic induction (for example, a communication method by ISO/IEC 14443, ISO/IEC 15693, or ISO/IEC 18092).

The antenna embedded layer 63 is a layer that holds the antenna 62. For example, the antenna 62 is embedded in the lower surface of the antenna embedded layer 63 or between the lower surface of the antenna embedded layer 63 and the upper surface of the intermediate layer 64 by being thermally pressed in a state of being arranged on the lower surface of the antenna embedded layer 63. The intermediate layer 64 is a layer for adjusting the thickness of the IC chip 61b. The upper protective layer 65 is a sheet material that protects the IC module 61, the antenna embedded layer 63, and the like by being laminated on the antenna embedded layer 63 on the upper side Z2. Similarly, the lower protective layer 66 is a sheet material that protects the IC module 61, the intermediate layer 64, and the like by being laminated on the intermediate layer 64 on the lower side Z1.

The base material 70 is a layer to become the base material 70 of the hinged laminate body 10. The lower transparent layer 80 forms the lowermost layer of the hinged laminate body 10. A printed layer 81 is provided on the upper surface of the lower transparent layer 80. Similarly to the printed layer 51 of the upper transparent layer 50, the printed layer 81 has common information printed thereon. The common information of the lower transparent layer 80 is, for example, information (not illustrated) regarding matters that require attention.

[Observation Aspect of Hinged Laminate Body 10]

FIGS. 3A, 3B, 4A, and 4B are views illustrating observation aspects of the hinged laminate body 10 of the first embodiment.

(Normal Observation State from Upper Side Z2: FIG. 3A)

In the following description, a state observed from a side irradiated with illumination light is referred to as a "normal observation state", and a state observed from the side opposite to the side irradiated with the illumination light is referred to as a "watermark observation state". In the normal observation state, that is, in a state where the upper surface of the hinged laminate body 10 is irradiated with the illumination light, the upper surface of the hinged laminate body 10 is observed from the upper side Z2 in the following manner. In the description of the observation aspects, an example in which the hinged laminate body 10 is observed alone will be described. However, even in a state of being bound to the passport 1, the hinged laminate body 10 can be similarly observed by being opened.

Printed information of the laser coloring layer 40 is visible through the upper transparent layer 50 (see arrow L1). In this case, since the printed layer 51 is formed by offset printing or the like and is thus easy to transmit light, the visibility of the printed information is hardly reduced. The following configuration is also the same. The printed information of the printed layer 51 at the lower surface of the upper transparent layer 50 is visible through the upper transparent layer 50 (see arrow L2). The white watermarked paper 30 and the base material 70 are arranged on the lower side Z1 below the printed layer 51. In the normal observation state in which the illumination light is emitted from the upper side Z2 and the observation is performed from the upper side Z2, the light amount from the lower side Z1 is small, so that the watermarked paper 30 and the like sufficiently block the light from the lower side Z1. Therefore, even if the printed layer 51 can easily transmit light, the printed layer 51 achieves high-quality color representation.

The marking 32 of the inner watermarked paper section 30a is visible through the laser coloring layer 40 and the upper transparent layer 50 (see arrow L3). Since the outer watermarked paper section 30b is exposed, the marking 32 of the outer watermarked paper section 30b is visible. In the normal observation state in which the illumination light is emitted from the upper side Z2 illustrated in FIG. 3A and observation is performed from the upper side Z2, little light passes through the watermarked paper 30 from the lower side Z1 (see arrows L4a and L5a). Therefore, the grayscale of the watermark 31 of the watermarked paper 30 cannot be distinguished and can hardly be identified. The electrical components of the component holding layer 60 are screened by the watermarked paper 30 and are thus not visible. Therefore, the hinged laminate body 10 can be improved in visual texture in the normal observation state. The printed information of the printed layer 81 on the upper surface of the lower transparent layer 80 is screened by the base material 70, the watermarked paper 30, and the like and is thus not visible. In the area where the hinge portion 21 is arranged, the watermark 31 is visible, and the watermarked paper 30 covers the upper surface of the hinge portion 21 of the hinge layer 20.

As described above, in the normal observation state from the upper side Z2, while the printed information of the watermarked paper 30 and each print on the upper side Z2 above the watermarked paper 30 is clearly visible, the watermark 31 is not visible excluding the portion formed in the outer watermarked paper section 30.

(Watermark Observation State from Upper Side Z2: FIG. 3B)

The watermark observation state is an aspect in which the upper surface of the hinged laminate body 10 is observed in a state where the lower surface of the hinged laminate body 10 is irradiated with the illumination light. In addition, as necessary, a strong light source may be arranged below the hinged laminate body 10. In the watermark observation state, the lower surface (surface opposite to the observation side) of the hinged laminate body 10 receives more intensive light than the upper surface (surface on the observation side). Therefore, the light amount passing through the base material 70 and the watermarked paper 30 from the lower side Z1 (see arrows L4b and L5b) in the watermark observation state is significantly larger than in the normal observation state.

The printed information of the laser coloring layer 40, the printed information of the upper transparent layer 50, and the printed information of the watermarked paper 30 are observed substantially in the same manner as in the normal observation state (illustration of the arrows is omitted). However, since light from the lower surface can be transmitted, the color representation of the printed information of the upper transparent layer 50 is inferior in the watermark observation state to the normal observation state. The portion in the watermarked paper 30 corresponding to the watermark 31 is thinner than the other portions. Therefore, the light amount passing through the watermark 31 (see arrow L5b) is larger than the light amount passing through the other portions (see arrow L4b). In addition, as described above, since the light amount passing through the watermarked paper 30 is significantly large, the difference in light amount can be distinguished as a grayscale. Accordingly, the watermark 31 is observed brighter than the other portions. Therefore, the information of the watermark 31 can be clearly distinguished. The electrical components of the component holding layer 60 do not transmit light. Therefore, as the light passes through the base material 70 and the watermarked paper 30, the electrical components are visible as dark portions.

As described above, in the watermark observation state from the upper side Z2, the watermark 31 is visible. In the watermark observation state, the observer determines authenticity of the passport 1 mainly by confirming the watermark 31. Therefore, even if the color representation of the printed information of the upper transparent layer 50 is inferior or the electrical component is visible, the quality of the outer appearance of the hinged laminate body 10 is not greatly affected. The hinged laminate body 10 may have high quality in the normal observation state. As described above, the watermarked paper 30 can improve the color representation of the printed layer 51 in the "normal observation state from the upper side Z2" in FIG. 3A, and can be used for authenticity of the passport 1 in the "watermark observation state from the upper side Z2" in FIG. 3B.

(Normal Observation State from Lower Side Z1: FIG. 4A)

In a state where the lower surface of the hinged laminate body 10 is irradiated with the illumination light, the lower surface of the hinged laminate body 10 is observed as follows. The printed information of the printed layer 81 on the upper surface of the lower transparent layer 80 is visible through the lower transparent layer 80 (see arrow L6). In addition, since the white base material 70 is arranged on the upper side Z2 on the printed layer 81, like the printed layer 51, the printed layer 81 achieves high-quality color representation. As in the "normal observation state from the upper side Z2", the watermark 31 transmits little light from the side opposite to the illumination light, that is, the upper side Z2 and is thus not visible. The electrical components of the component holding layer 60 are screened by the base material 70 and are thus not visible. Therefore, the hinged laminate body 10 can be improved in visual texture in the normal observation state. Similarly, each printed information and the like on the upper side Z2 above the hinge layer 20 is also screened by the base material 70 and is thus not visible.

(Watermark Observation State from Lower Side Z1: FIG. 4B)

The printed information of the lower transparent layer 80 is substantially the same as the "normal observation state from the lower side Z1" in FIG. 4A. However, since light from the upper surface can be transmitted, the color representation of the printed information of the lower transparent layer 80 is inferior in the watermark observation state to the normal observation state. The watermark 31 of the watermarked paper 30 transmits much light from the side opposite to the illumination light, that is, the upper side Z2 and thus can be clearly distinguished as in the "watermark observation state from the upper side Z2" in FIG. 3B. The electrical components of the component holding layer 60 are visible as dark portions as in the "watermark observation state from the upper side Z2" in FIG. 3B. As described above, the watermark 31 is visible in the watermark observation state from the lower side Z1. Furthermore, the watermark 31 is contiguously observed across the outer watermarked paper section 30b and the inner watermarked paper section 30a as in the "watermark observation state from the upper side Z2" in FIG. 3B.

[Security]

The hinged laminate body 10 of the present embodiment exhibits, for example, the following operations and effects regarding security.

(1) The hinged laminate body 10 uses the watermarked paper 30 as a member for authenticity determination. Therefore, the hinged laminate body 10 can perform the authenticity determination in an aspect different from the authenticity determination such as a hologram in the related art. Also, a new preference different from the related art can be achieved.

(2) The marking 32 of the watermarked paper 30 is the unique information provided in the watermarked paper 30 itself, which is a member for authenticity determination. Therefore, the watermarked paper 30 on which the marking 32 has already been processed cannot be diverted. Accordingly, it is difficult to forge the hinged laminate body 10, resulting in improved security.

(3) The state in which the watermarked paper 30 and the laser coloring layer 40 are adhered to each other is a state in which a portion of the resin of the laser coloring layer 40 is incorporated into the fibers of the paper of the watermarked paper 30. The same applies to the watermarked paper 30 and the hinge layer 20. Therefore, in a case where the hinged laminate body 10 is disassembled, the watermarked paper 30, which is a paper medium, is broken in such a form that the adhered is broken. That is, the watermarked paper 30 is separated into a portion adhered to the laser coloring layer 40 as the upper layer thereof and a portion adhered to the hinge layer 20 as the lower layer thereof. Therefore, the watermarked paper 30 after disassembling the hinged laminate body 10 cannot be diverted. Accordingly, it is difficult to forge the hinged laminate body 10, resulting in improved security.

(4) The watermark 31 and the marking 32 (hereinafter, also referred to as "watermark 31 and the like") of the water-marked paper 30 are contiguous across the inner watermarked paper section 30a and the outer watermarked paper section 30b (see FIGS. 1A and 1B). Here, it is very difficult to separately form the watermark 31 and the like formed in the inner watermarked paper section 30a and the watermark 31 and the like formed in the outer watermarked paper section 30b. Accordingly, the hinged laminate body 10 can be improved in security. In addition, the hinged laminate body 10 is excellent in design. Furthermore, as described in (3), in a case where the hinged laminate body 10 is disassembled, the watermarked paper 30 is broken. Therefore, the watermark 31 and the like are divided at the boundary. Accordingly, the hinged laminate body 10 can be further improved in security.

As described above, the hinged laminate body 10 of the passport 1 of the present embodiment can use the watermarked paper 30 for authenticity determination. In addition, the hinged laminate body 10 costs low even if the installation area of the watermarked paper 30 is increased.

Second Embodiment

Figure 5:
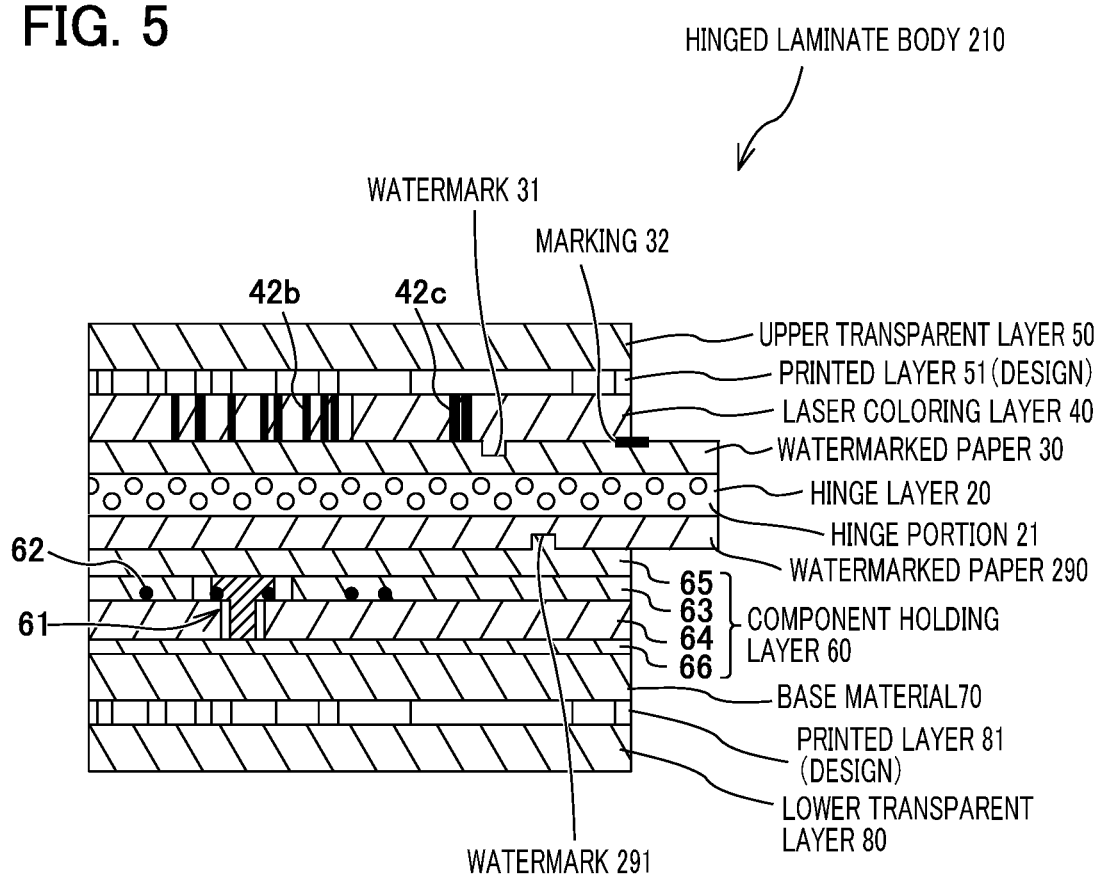
FIG. 5 is a cross-sectional view of a hinged laminate body 210 of a second embodiment.

Next, a second embodiment of the present invention will be described. In the following description and the drawings, like elements which have the same function as those of the first embodiment are denoted by like reference numerals or the ends (last two digits) thereof are denoted by like reference numerals as appropriate, and an overlapping description will be omitted as appropriate. FIG. 5 is a cross-sectional view of a hinged laminate body 210 of the second embodiment. The hinged laminate body 210 includes watermarked paper 290 (watermarked sheet material) on the lower side Z1 under the hinge layer 20 in addition to the watermarked paper 30 on the upper side Z2 on the hinge layer 20. The watermarked paper 30 and the watermarked paper 290 are the same in outer shape but differ from each other only in lamination position. Therefore, the watermarked paper 290 screens the lower surface of the hinge portion 21. The watermarked paper 290 is laminated between the hinge layer 20 and the component holding layer 60 and thermally welded thereto. The watermarked paper 290 may also be provided with the same marking as the watermarked paper 30.

Although illustration is omitted, the pattern of a watermark 291 of the watermarked paper 290 and the pattern of the watermark 31 of the watermarked paper 30 are different from each other. As in the watermarked paper 30, the watermark 291 is visible in the watermark observation state from the upper side Z2 (FIG. 3B) and the watermark observation state from the lower side Z1 (see FIG. 4B). In these observation states, a pattern in which the pattern of the watermark 291 of the watermarked paper 290 and the pattern of the watermark 31 of the watermarked paper 30 are combined is observed. As a result, it is difficult to forge the hinged laminate body 210. Therefore, the effect of suppressing forgery can be improved, and excellent design can be achieved.

Third Embodiment

Figure 6:
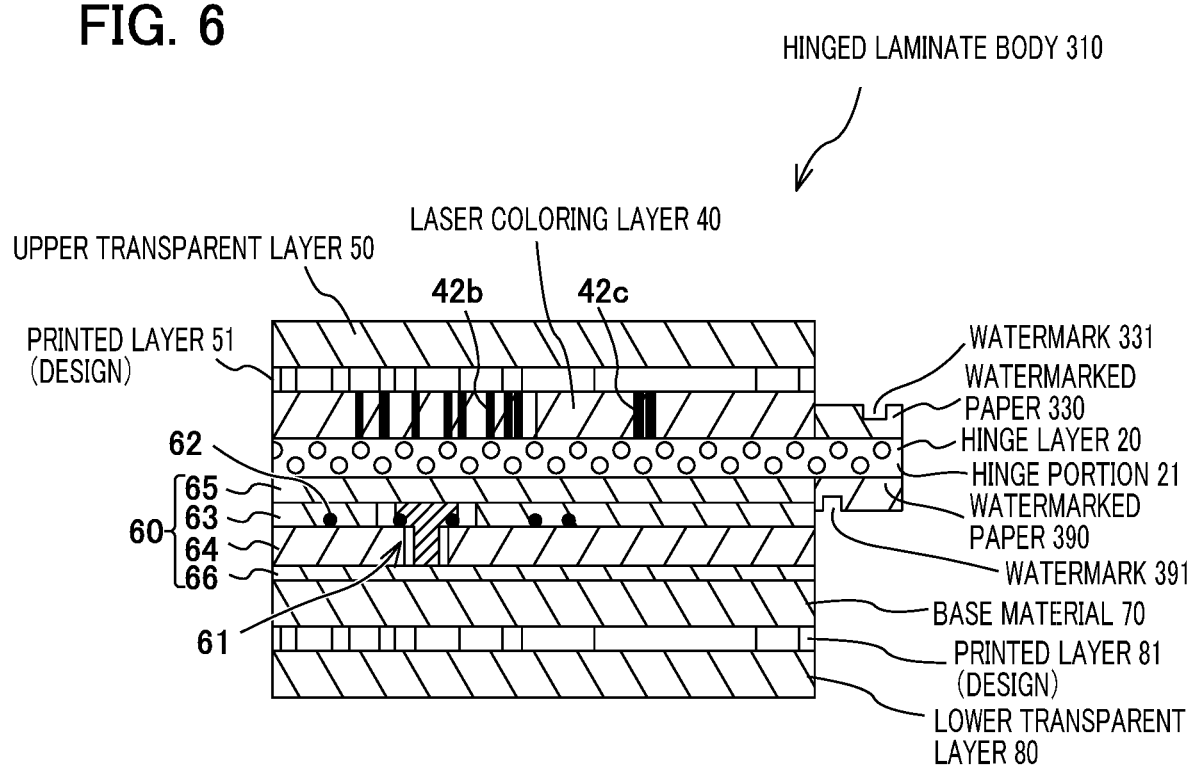
FIG. 6 is a cross-sectional view of a hinged laminate body 310 of a third embodiment.

FIG. 6 is a cross-sectional view of a hinged laminate body 310 of a third embodiment. In the hinged laminate body 310, layers of watermarked paper 330 and 390 are arranged only on the upper and lower surfaces of the hinge portion 21 of the hinge layer 20. That is, the watermarked paper 330 does not have an inner watermarked paper section, but has only an outer watermarked paper section. Similarly, the watermarked paper 390 does not have an inner watermarked paper section, but has only an outer watermarked paper section. Therefore, the layers of watermarked paper 330 and 390 have a smaller outer shape than in the second embodiment. Accordingly, the hinged laminate body 310 costs low.

Since the upper and lower surfaces of the hinge portion 21 are not exposed, the quality of the outer appearance of the hinged laminate body 310 can be improved as in the second embodiment. In the hinged laminate body 310, the watermarked paper may be arranged only on one side of the hinge portion 21. In this case, the hinged laminate body 310 costs lower.

Fourth Embodiment

Figure 7:
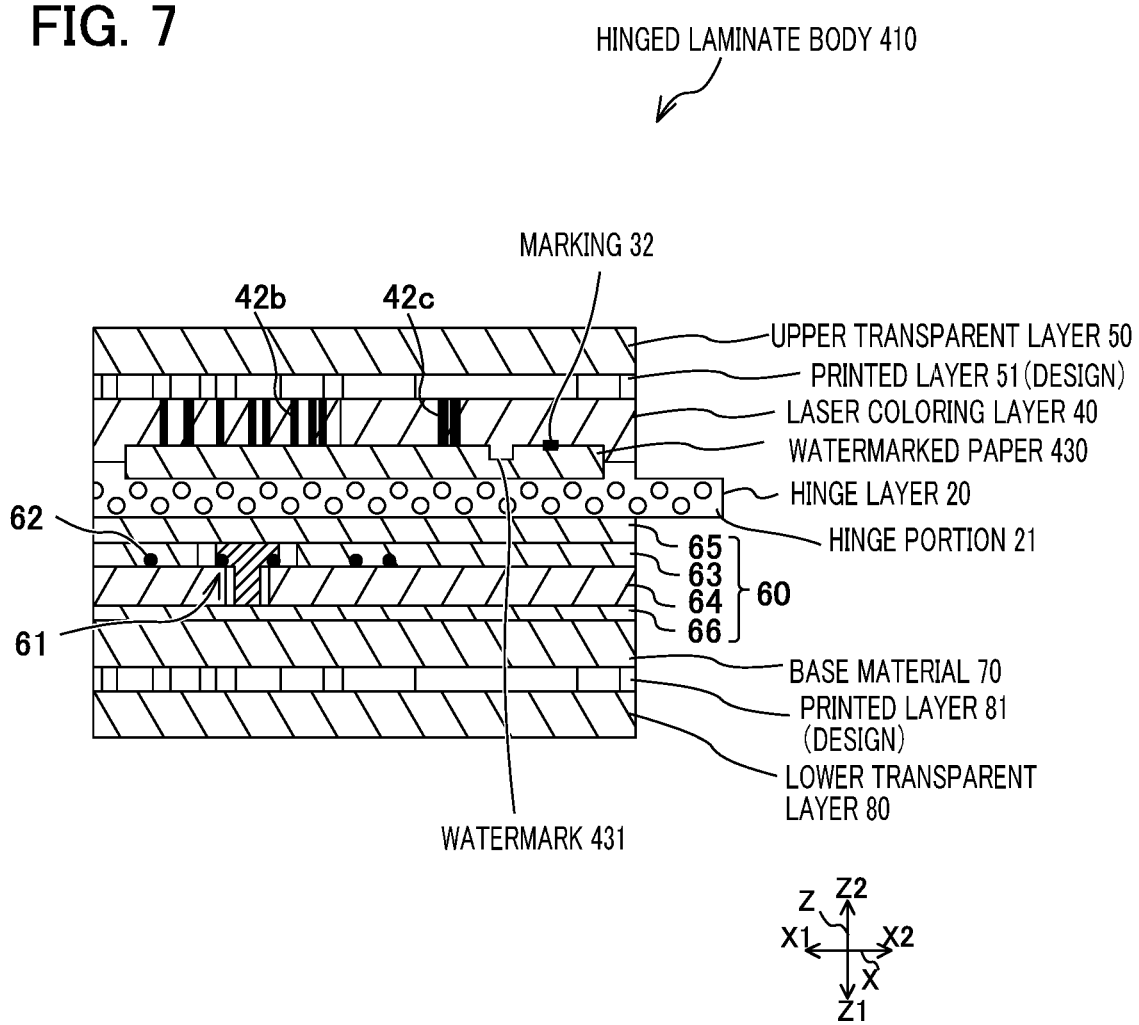
FIG. 7 is a cross-sectional view of a hinged laminate body 410 according to a fourth embodiment.

FIG. 7 is a cross-sectional view of a hinged laminate body 410 according to a fourth embodiment. The outer shape of watermarked paper 430 of the hinged laminate body 410 is smaller than the outer shape of the laser coloring layer 40 and the like. Therefore, the hinge layer 20 and the laser coloring layer 40 are welded so as to surround the watermarked paper 430 in an area outside the watermarked paper 430. Therefore, the watermarked paper 430 is completely accommodated inside the hinged laminate body 410 and is not exposed to the outside. Accordingly, the watermarked paper 430 is protected from being stained. In addition, in the hinged laminate body 410 according to the present embodiment, as in the second embodiment, the watermarked paper may also be arranged on the lower side Z1 of the hinge layer 20.

Fifth Embodiment

Figure 8:
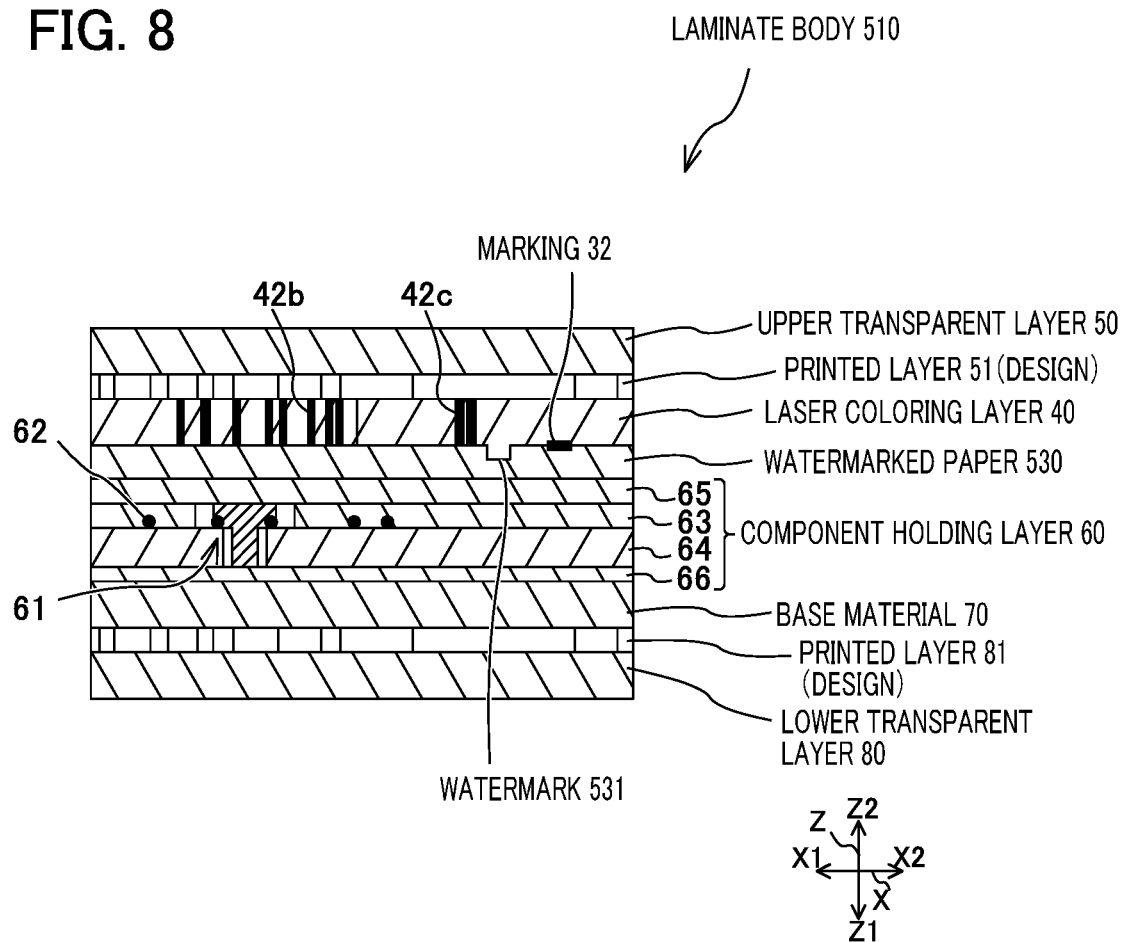
FIG. 8 is a cross-sectional view of a laminate body 510 of a fifth embodiment.

FIG. 8 is a cross-sectional view of a laminate body 510 of a fifth embodiment. The laminate body 510 is an IC card, and is obtained by removing the hinge layer from the hinged laminate body of the first embodiment. The laminate body 510 can be used, for example, as an ID card, a prepaid card issued by transportation facilities or the like. The outer shape of watermarked paper 530 is the same as the outer shapes of the other layers 40, 50, 60, 70, and 80, and is smaller than that of the first embodiment. The watermarked paper 530 is arranged between the laser coloring layer 40 and the component holding layer 60. Therefore, the watermark 31 and the marking 32 are not exposed to the outside.

Furthermore, although the end portion of the watermarked paper 530 is exposed to the outside, the upper and lower surfaces of the watermarked paper 530 are not exposed to the outside. Therefore, the watermarked paper 530 is protected from being stained. As described above, the laminate body 510 can be used as an ID card by not including the hinge layer. The observation aspects of the laminate body 510 are the same as those of the first embodiment.

The laminate body 510 may be deformed as follows.
(1) As in the second embodiment, two layers of watermarked paper may be provided. In this case, another layer of the watermarked paper may be arranged, for example, between the base material 70 and the lower transparent layer 80.
(2) As in the fourth embodiment, by making the outer shape of the watermarked paper 530 smaller than those of the other layers 40, 50, 60, 70, and 80, the watermarked paper 530 may be completely accommodated inside the laminate body 510.
(3) The component holding layer 60 may be removed. In this case, the watermarked paper can be used as a security medium laminated inside a transparent resin. This medium may be used, for example, as a cash voucher or various tickets. Even in this case, modification as in (1) and (2) described above may be made.

The modification exhibits the operations and effects of the embodiment corresponding to the modified aspect. For example, in the case of (1) described above, as described in the second embodiment, the operation and the effect that a pattern having two watermarks combined can be observed can be exhibited.

While the embodiments of the present invention have been described above, the present invention is not limited to the above-described embodiments. For example, various modifications and changes can be made as in a modification embodiment described below and the like, and these are also within the technical scope of the present invention. In addition, the effects described in the embodiments are merely listed as the most preferable effects caused by the present invention, and the effects of the present invention are not limited to those described in the embodiments. The embodiments described above and the modification embodiment described below can be used in combination as appropriate, and a detailed description thereof will be omitted.

Modification Embodiment

In the embodiment, the example in which the component holding layer is transparent is described, but the component holding layer is not limited thereto. The component holding layer may have a light shielding property such that the watermark of the watermarked paper can be observed in the watermark observation state.

EXPLANATION OF REFERENCE NUMERALS

1 PASSPORT
10, 210, 310, 410 HINGED LAMINATE BODY
20 HINGE LAYER
21 HINGE
30, 290, 330, 390, 430, 530 WATERMARKED PAPER
30a INNER WATERMARKED PAPER SECTION
30b OUTER WATERMARKED PAPER SECTION
31, 291, 331, 391, 431, 531 WATERMARK
32 MARKING
40 LASER COLORING LAYER
50 UPPER TRANSPARENT LAYER
60 COMPONENT HOLDING LAYER
61 IC MODULE
62 ANTENNA
70 BASE MATERIAL
80 LOWER TRANSPARENT LAYER
510 LAMINATE BODY

The invention claimed is:
1. A hinged laminate body comprising:
a transparent resin layer;
a laser coloring layer arranged below the transparent resin layer;
a watermarked sheet material arranged below the laser coloring layer; and
a hinge layer that is arranged below the watermarked sheet material and has, in plan view, a portion overlapping with the transparent resin layer and a hinge portion protruding from the portion overlapping with the transparent resin layer, wherein the watermarked sheet material includes:
   an interlayer arrangement portion arranged between the transparent resin layer and the hinge layer; and
   a hinge arrangement portion that is provided to the hinge portion so as to be arranged contiguously with the interlayer arrangement portion,
wherein the watermarked sheet material has a watermark, and
wherein the watermark is formed contiguously with the interlayer arrangement portion and the hinge arrangement portion.

2. The hinged laminate body according to claim 1,
wherein the watermarked sheet material includes a laser marking, and
the laser marking is contiguous with the interlayer arrangement portion and the hinge arrangement portion.

3. The hinged laminate body according to claim 1, further comprising:
   an electronic component holding layer that is disposed below the watermarked sheet material and holds an electronic component.

4. A booklet comprising: the hinged laminate body according to claim 1 bound at the hinge portion.

5. A hinged laminate body comprising:
a transparent resin layer;
a laser coloring layer arranged below the transparent layer;
a watermarked sheet material including watermarked paper and arranged below the laser coloring layer; and
a hinge layer that is arranged below the watermarked sheet material and has, in plan view, a portion overlapping with the transparent resin layer and a hinge portion protruding from the portion overlapping with the transparent resin layer,
wherein the watermarked sheet material includes:
   an interlayer arrangement portion arranged between the transparent resin layer and the hinge layer; and
   a hinge arrangement portion that is provided to the hinge portion so as to be arranged contiguously with the interlayer arrangement portion;
wherein the watermarked paper has a watermark,
and wherein a portion of the watermarked paper is adhered to the laser coloring layer and a portion of the watermarked paper is adhered to the hinge layer.

* * * * *